United States Patent
Yamazaki et al.

(10) Patent No.: US 6,860,334 B2
(45) Date of Patent: Mar. 1, 2005

(54) WALK-BEHIND TILLER

(75) Inventors: Nobuo Yamazaki, Wako (JP); Keiji Iino, Wako (JP); Fumiyoshi Kanbara, Wako (JP); Yoshitaka Oota, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/670,720

(22) Filed: Sep. 25, 2003

(65) Prior Publication Data

US 2004/0140108 A1 Jul. 22, 2004

(30) Foreign Application Priority Data

Jan. 16, 2003 (JP) .......................... 2003-008455
Jan. 16, 2003 (JP) .......................... 2003-008471

(51) Int. Cl.$^7$ .............................................. A01B 33/00
(52) U.S. Cl. .......................... 172/42; 172/397; 16/437; 16/444
(58) Field of Search .................. 56/239; 16/110.1, 16/112.1, 436, 437, 421, 444, 446; 172/397, 42

(56) References Cited

U.S. PATENT DOCUMENTS

| | | | | |
|---|---|---|---|---|
| 2,535,466 A | * | 12/1950 | Neal | 16/437 |
| D173,976 S | * | 2/1955 | Butler | D15/18 |
| 3,204,272 A | * | 9/1965 | Greene et al. | 15/49.1 |
| 3,357,716 A | * | 12/1967 | Musichuk | 280/47.371 |
| 3,534,432 A | * | 10/1970 | Davies et al. | 16/437 |
| 3,649,997 A | * | 3/1972 | Thorud | 16/437 |
| 4,132,280 A | * | 1/1979 | Jones et al. | 180/19.3 |
| 4,396,067 A | * | 8/1983 | Enters et al. | 172/42 |
| 4,476,643 A | | 10/1984 | Hilchey et al. | 37/245 |
| 4,699,219 A | * | 10/1987 | Durrant et al. | 172/42 |
| 4,878,339 A | | 11/1989 | Marier et al. | 56/14.7 |
| 5,203,147 A | | 4/1993 | Long | 56/10.1 |
| 5,442,901 A | | 8/1995 | Niemela et al. | 56/11.9 |

FOREIGN PATENT DOCUMENTS

| | | | | |
|---|---|---|---|---|
| FR | 2631206 A3 | * | 11/1989 | A01D/34/68 |
| FR | 2720891 | | 12/1995 | |
| JP | 63044310 | | 11/1988 | |
| JP | 2134801 | | 11/1990 | |
| JP | 05008653 | | 1/1993 | |
| JP | 05015223 A | * | 1/1993 | A01D/34/68 |

* cited by examiner

Primary Examiner—Thomas B. Will
Assistant Examiner—Alexandra K. Pechhold
(74) Attorney, Agent, or Firm—Adams & Wilks

(57) ABSTRACT

A walk-behind tiller has a body and a pair of wheels mounted on the body for undergoing rotation to cause the walk-behind tiller to undergo travelling along a ground surface. A tilling device is mounted on the body for undergoing a first movement operation in which the tilling device travels along the ground surface while the tilling device is disposed in spaced-apart relation to the ground surface, a second movement operation in which the tilling device tills the ground, and a third movement operation in which the tilling device is maintained generally horizontal to the ground surface. A handle has proximal portions, a pair of grip portions connected to the proximal portions and configured to be gripped by an operator to maintain the tilling device generally parallel to the ground surface during the third movement operation, a pair of rising portions connected to the grip portions and configured to be tilted by the operator during the second movement operation to cause the tilling device to till the ground, and a cross portion disposed between the rising portions and configured to be gripped and pressed by an operator to produce a force tending to move the tilling device about the rotational axis to maintain the tilling device in spaced-apart relation to the ground surface.

16 Claims, 16 Drawing Sheets

WALK-BEHIND TILLER

FIELD OF THE INVENTION

The present invention relates to a walk-behind tiller and, more particularly, to an improved loop-shaped handle extending obliquely from the rear of a tiller body rearwardly upwardly.

BACKGROUND OF THE INVENTION

This kind of loop-shaped handle is disclosed, for example, in Japanese Utility Model Laid-Open Publication No. SHO-63-44310. This handle has a vertical position adjusting structure so that the handle is vertically adjustable to a height. This handle structure will be described with reference to FIGS. 14 and 15 hereof.

Referring to FIGS. 14 and 15, the handle 100 is loop-shaped handle and has a pair of left and right handle bars 102, 102 obliquely extending rearwardly upwardly from a handle mounting portion 120 provided at the rear of a tiller body (not shown), and a linear horizontal handle bar 103 extending transversely of the body for connecting the rear ends of the handle bars 102, 102.

A C-shaped member 104 protruding toward the tiller body is mounted to a central portion of the horizontal handle bar 103. A vertical position adjusting grip lever 105 for controlling the relative height of the bar to the tiller body is attached to the C-shaped member 104.

To the proximal end of the handle 100, as shown in FIG. 15, an arc member 106 with a plurality of pin holes 107 formed above and below is mounted. A lock pin 108 to be fitted into or removed from one of the pin holes 107 is connected to a release wire 109 which in turn is connected to the vertical position adjusting grip lever 105.

To the rear of the left and right handle bars 102, 102, clutch grip levers 130, 130 for on/off control of clutches (not shown) are attached via release wires 131, 131 connected to the clutches.

The above handle 100 structure requires adjustment of height of the handle 100 so as to correspond to different work postures taken for tilling, mere traveling and other operations with the tiller. The height adjustment is made by holding the grip lever 105, pulling the release wire 109, releasing the engagement between the lock pin 108 and one of the pin holes 107, and then aligning the lock pin 108 with one of the pin holes 107 corresponding to the height to which the handle 100 is to be adjusted, releasing the grip lever 105, engaging the lock pin 108 with the pin hole 107, and thereby adjusting the handle 100 to a desired height.

The above handle structure allows comfortable work postures for which, however, it requires the operation of engaging and disengaging the lock pin 108, taking time in height adjustment. The above vertical position adjustment configuration consists of a number of components and is thus complicated, making it difficult to reduce production costs. For operating the clutches with the above clutch grip levers 130, 130 when performing tilling operation holding the horizontal handle bar 103, it is required to change the positions of the hands to the left and right handle bars 102, 102. This results in the problem that the effect of forming the handle 100 in a loop cannot be exerted.

Another example tiller with a pair of left and right bar handles extending obliquely from the rear of a tiller body rearwardly upwardly and arranged to be vertically adjustable at their proximal ends is disclosed in Japanese Utility Model Laid-Open Publication No. HEI-2-134801. This tiller is shown in FIG. 16 hereof.

Referring to FIG. 16, the tiller 200 has a handle supporting member 211 provided on an upper central portion of a tiller body 210 and extending rearward. A pair of left and right bar handles 220 is vertically swingably attached to a rear end portion of the handle supporting member 211 via a shaft 212. The bar handles 220 can be adjusted in height by unfastening a handle height adjustment lever 213, then vertically swinging the bar handles 220, and fastening the lever 213 at a desired height, so that the handle height can be changed according to working conditions.

While the above tiller 200 provided with the handle height adjustment lever 213 can improve the work posture of an operator, it has the problem of an increased number of components and increased production costs.

As another example of a clutch lever configuration for controlling a tiller in which clutch levers are formed in loops like an operating handle is disclosed, for example, in Japanese Patent Laid-Open Publication No. HEI-5-8653. This clutch lever configuration is shown in FIG. 17.

Referring to FIG. 17, a looped driving clutch lever 302 and working clutch lever 303 are swingably supported on a rear lower portion of a looped operating handle 300 via a bracket 301. The two clutch levers 302, 303 are provided in proximity but are so far from a handle grip 300a that it is required to unhand the handle grip 300a to switch the clutch levers 302, 303 from off to on, resulting in the problem of reduced clutch operability.

In this context, there is a demand for a walk-behind tiller which allows for comfortable work postures in different operations and improves maneuverability of a clutch lever.

SUMMARY OF THE INVENTION

According to the present invention, there is provided a walk-behind tiller comprising: a body; a pair of left and right travel wheels mounted to opposite ends of an axle extending transversely of the body; a tilling device provided on the body forwardly of the travel wheels; and a loop-shaped handle having proximal portions extending from rear portions of the body obliquely rearwardly upwardly. The loop-shaped handle comprises left and right horizontal grips extending rearwardly substantially horizontally from rear ends of the handle proximal portions; left and right rising portions extending upwardly from rear ends of the left and right horizontal grips substantially orthogonally to the oblique handle proximal portions; and a cross portion interposed between upper ends of the left and right rising portions, whereby the left and right horizontal grips are held for holding the tiller substantially horizontally, the left and right rising portions are held when the tiller is in operation, and the cross member is held for forcing the handle down.

For moving or turning the tiller, it is necessary to lift the tilling device and hold it apart from the traveling surface, whereupon the operator can manually hold the cross portion of the handle to position the arms at an angle suitable for constantly applying force without stooping, turning the tiller in a comfortable work posture.

In tilling operations in which the handle having the left and right rising portions is lifted up, the operator grips the left and right rising portions for operations. That is, by manually holding the left and right rising portions, the operator can apply an oblique pressure force in a forward and downward direction by the hands and arms to the tilling device in a natural posture. Thus, when the operation changes into a tilling operation, the operator can also work in a comfortable posture.

For holding the handle having the left and right horizontal grips approximately horizontally, the left and right horizontal grips are held. Specifically, for operations other than tilling operations with the tilling device, such as ridging operations with a ridger connected to the tiller or ditching operations with a ditch scoop connected to the tiller, the operator can manually hold the left and right horizontal grips to cause the holding power of the hands and arms to act at the tilling device and another operating device such as a ridger or a ditch scoop in a natural posture. The operator can thus work in comfort at all times during operations other than tilling operations.

For holding the handle having the left and right horizontal grips substantially horizontally, the left and right horizontal grips are held. This facilitates controls for stabilizing the work position of the tiller body such as lateral balancing of the body or fine adjustment of vertical position of the handle, allowing good results of other operations such as ridging and ditching.

The handle is a looped steel pipe and has a simple configuration including at least the left and right horizontal grips and left and right rising portions, resulting in reduction in handle production costs.

Preferably, the tiller further comprises a clutch lever provided at the loop-shaped handle, which clutch lever comprises: left and right supported ends swingably supported on at least one of the left and right horizontal grips; left and right lever horizontal portions extending rearwardly from the left and right supported ends and shaped correspondingly to the left and right horizontal grips of the handle; and left and right lever forwardly-tilted portions extending upwardly from rear ends of the left and right lever horizontal portions and shaped correspondingly to the left and right rising portions of the handle.

For working the soil with the tiller, the handle is lifted to cause the tilling device to dig into the traveling surface. At that time, the operator can put the fingers on the lever forward-tilted portions while putting the hands on the left and right rising portions of the handle and hold the rising portions and the lever forward-tilted portions of the clutch lever together. Thus, for manually operating the clutch lever for working the soil, it is not necessary to change the current positions of the hands holding the rising portions of the handle.

The clutch lever of the tiller according to the present invention has the left and right lever forward-tilted portions having a shape corresponding to the shape of the left and right rising portions of the handle, so that the lever forward-tilted portions are positioned in proximity to the rising portions of the handle, resulting in improved operability.

The clutch lever has the left and right lever horizontal portions having a shape corresponding to the shape of the left and right horizontal grips of the handle. For operations other than tilling operations with the tilling device such as ridging operations with a ridger connected to the tiller or ditching operations with a ditch scoop connected to the tiller, the operator can put the fingers on the lever horizontal portions while putting the hands on the left and right horizontal grips of the handle and hold the horizontal grips and the lever horizontal portions of the clutch lever together. Thus, for manually operating the clutch lever for operations other than tilling operations, it is needless to change the current positions of the hands holding the horizontal grips of the handle.

BRIEF DESCRIPTION OF THE DRAWINGS

A preferred embodiment of the present invention will be described in detail below, by way of example only, with reference to the accompanying drawings, in which.

DETAILED DESCRIPTION OF THE PREFERRED EMBODIMENT

Figure 1:
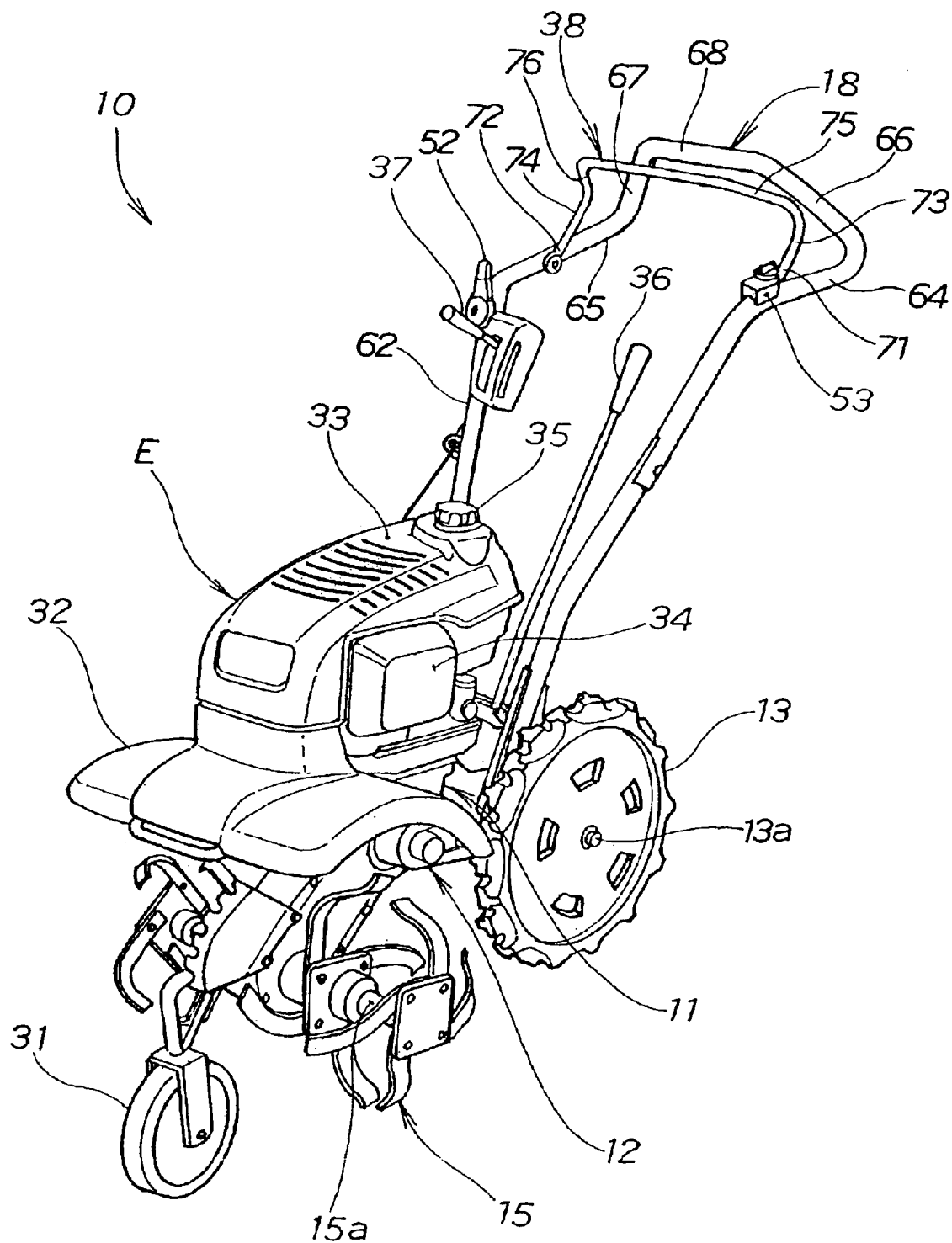
FIG. 1 is a perspective view of a walk-behind tiller according to the present invention.

A walk-behind tiller (hereinafter referred to merely as a "tiller") 10 according to the present invention shown in FIGS. 1 to 3 includes a body 11, an engine E provided on the body 11, a power transmission 12 mounted to the body 11, left and right travel wheels 13, a tilling device 15, and an operating machine such as a ridger 17 provided behind the travel wheels 13, for tilling agricultural field with the tilling device 15 while furrowing. The power transmission 12 transmits power generated by driving of the engine E to the left and right travel wheels 13 and to the tilling device 15.

Figure 2:
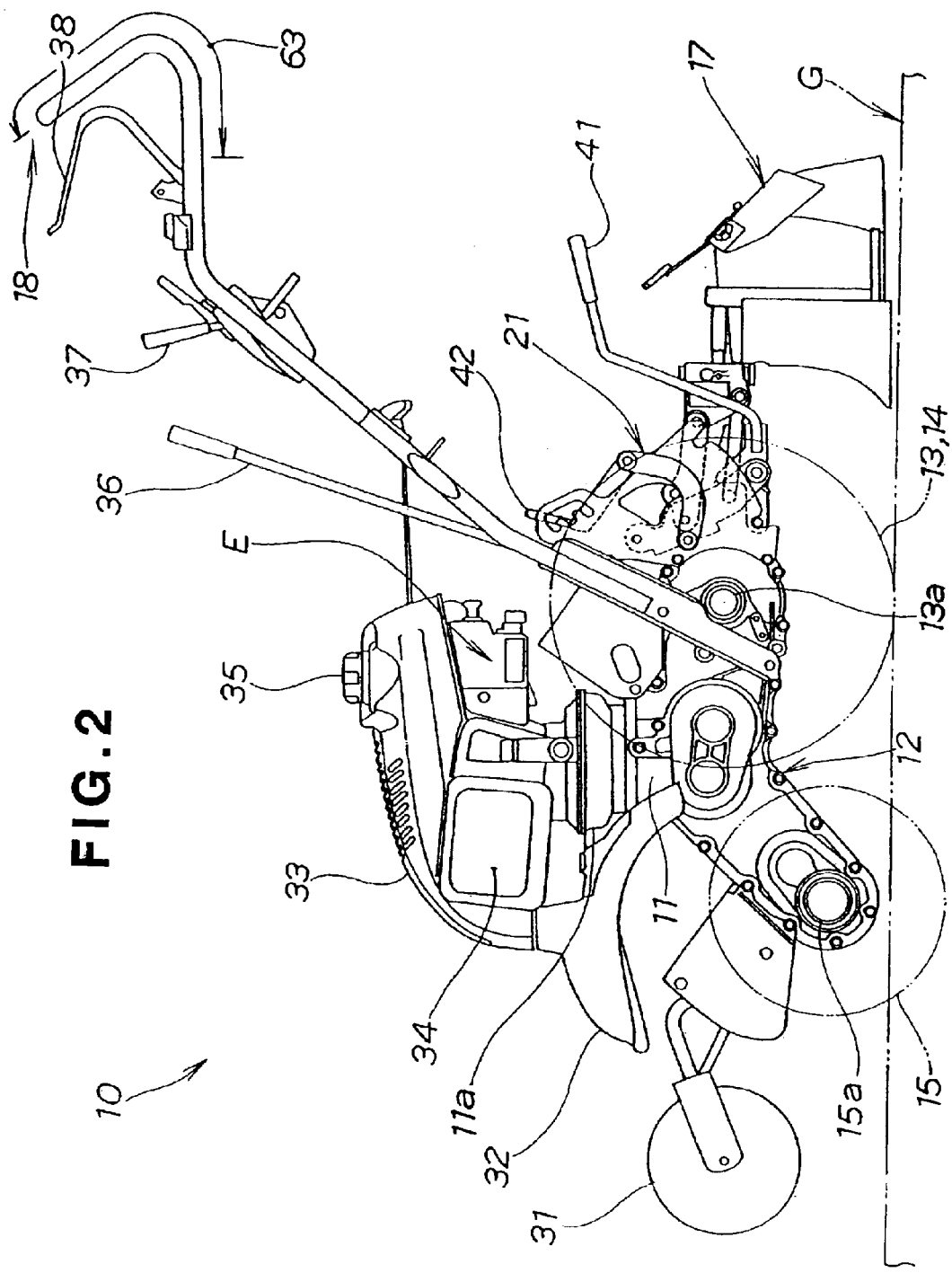
FIG. 2 is a side view of the walk-behind tiller according to the present invention provided with a ridger.

As shown in FIG. 2, the power transmission 12 is mounted below a clutch case 11a containing a clutch provided below the engine E. The tilling device 15 is rotatably mounted to the front of the power transmission 12 via a rotor shaft 15a. The left and right travel wheels 13 are rotatably mounted to the rear of the power transmission 12 via an axle 13a. A handle 18 obliquely extends from the rear of the power transmission 12 in a rearward and upward direction. A connecting mechanism 21 for connecting the ridger 17 is mounted to the rear end of the power transmission 12. Reference sign G denotes a traveling surface.

A travel assisting wheel 31 is mounted to a front end portion of the power transmission 12 in a vertical-position-adjustable manner. A fender 32 covers the power transmission 12 and the tilling device 15 from above. The engine E is covered by an engine cover 33. Reference numeral 34 denotes an air cleaner, and 35 a fuel tank filler cap. The ridger 17 is turned up by operating a lifting lever 41 and is adjusted in sinking position by the operation of a vertical position adjustment lever 42.

Reference numeral 36 designates a shift lever; 37 a differential lock lever; and 38 a clutch lever.

Figure 3:
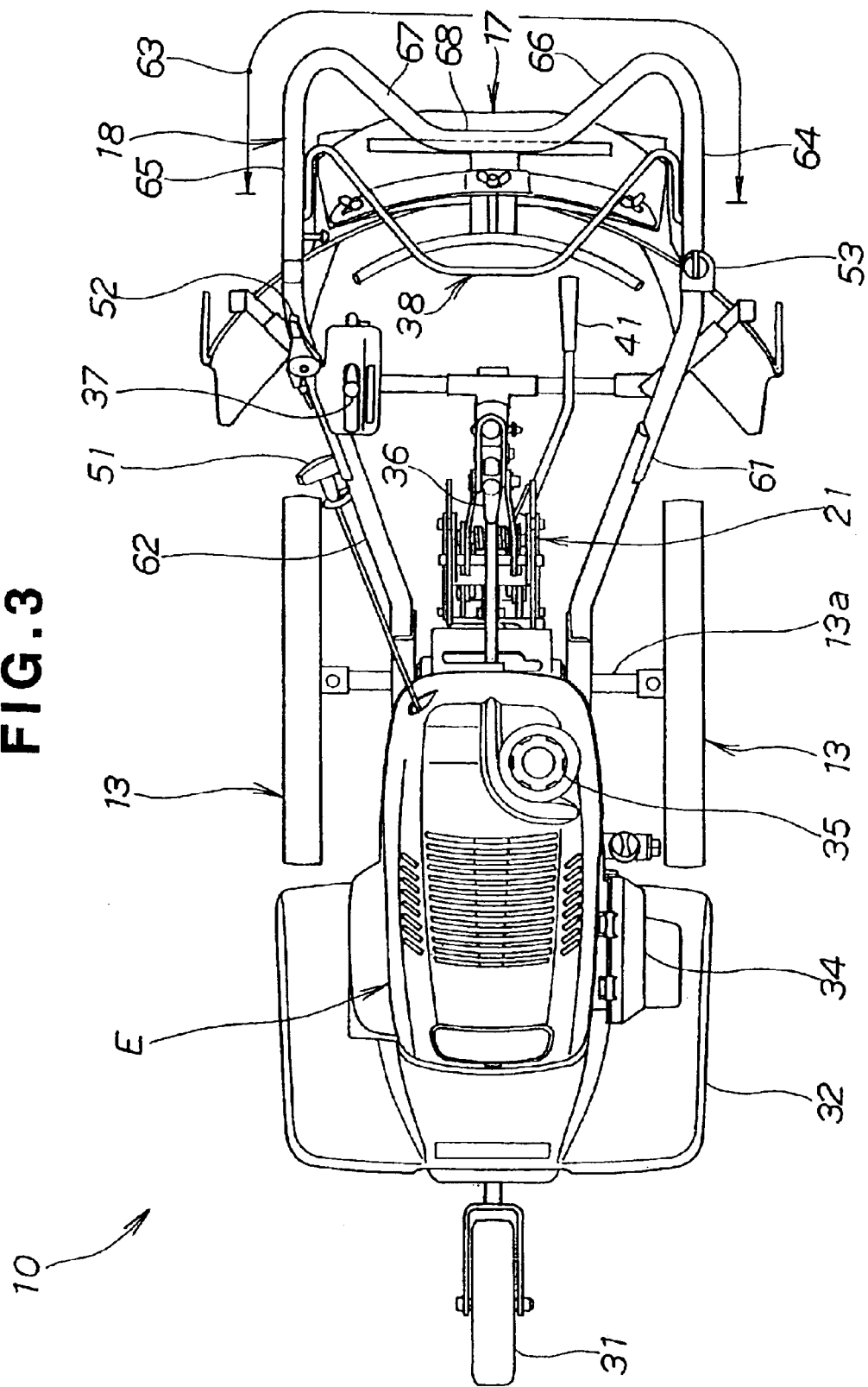
FIG. 3 is a plan view of the tiller shown in FIG. 2.

As shown in FIG. 3, a recoil starter knob 51 for starting the engine E, a throttle lever 52 for controlling the output of the engine E and the diff-lock lever 37 are arranged at a right front portion of the handle 18. An engine switch 53 for driving and stopping the engine E is mounted on a left rear portion of the handle 18. The clutch lever 38 is mounted to a rear portion of the handle 18. The shift lever 36 extends rearward from the rear center of the power transmission 12 (see FIG. 2). The lifting lever 41 extends rearward from a left rear portion of the connecting mechanism 21.

The handle 18 is made of a steel pipe formed in a loop, including handle proximal portions 61, 62 and a handle grip 63. The handle grip 63 consists of left and right horizontal grips 64, 65, left and right rising portions 66, 67 and a cross portion 68.

FIGS. 4 to 7 illustrate the handle 18 and the clutch lever 38 of the tiller 10 according to the present invention.

Figure 4:
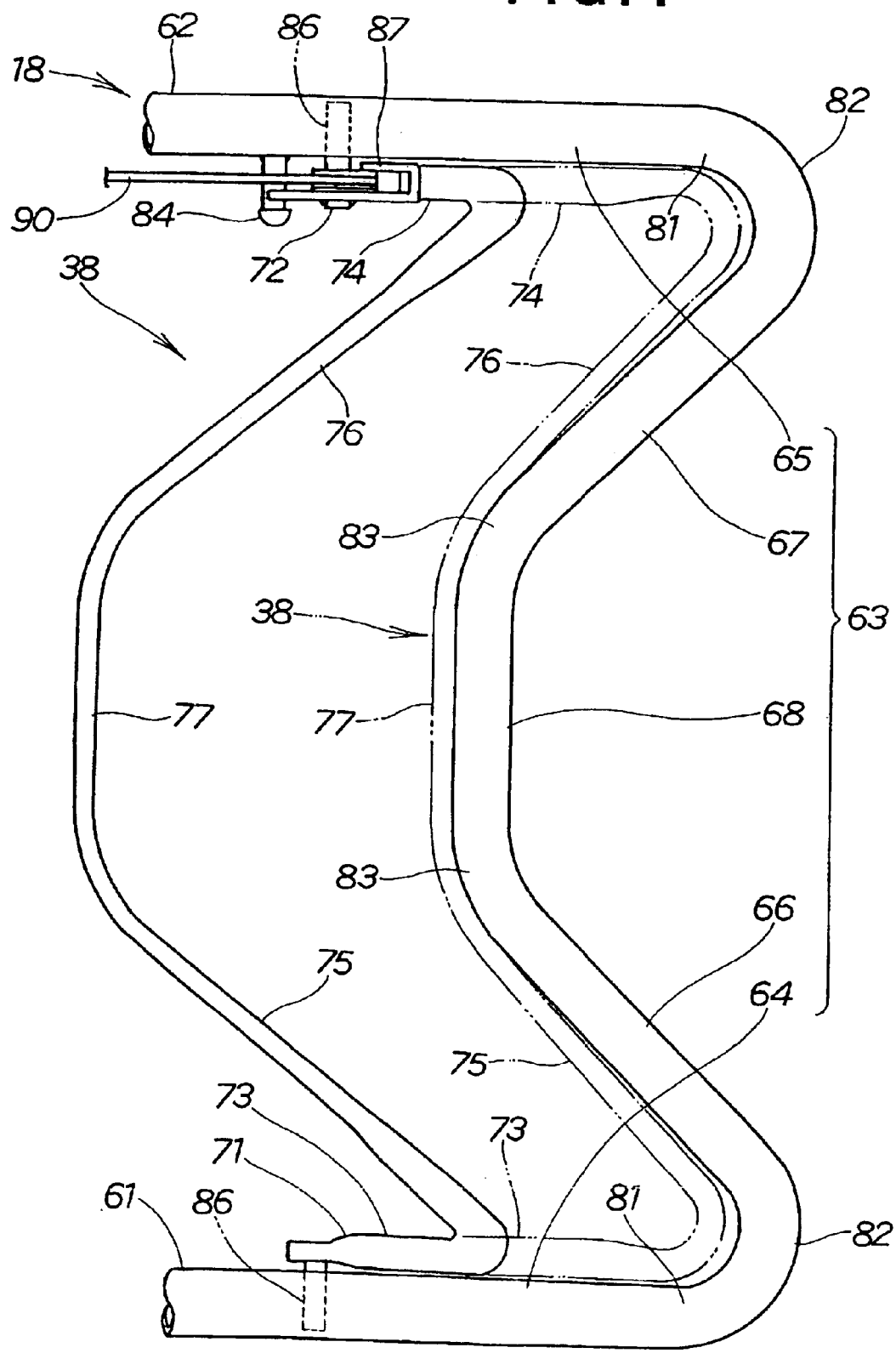
FIG. 4 is a plan view of a handle and clutch lever shown in FIG. 3.

As shown in FIG. 4, the clutch lever 38 consists of left and right supported ends 71, 72 swingably supported on the left and right horizontal grips 64, 65 of the handle 18, left and right lever horizontal portions 73, 74 extending rearward from the supported ends 71, 72 in correspondence with the left and right horizontal grips 64, 65, left and right lever forward-tilted portions 75, 76 extending upward from the rear ends of the lever horizontal portions 73, 74 in correspondence with the left and right rising portions 66, 67, and a lever cross portion 77 corresponding to the cross portion 68.

Figure 5:
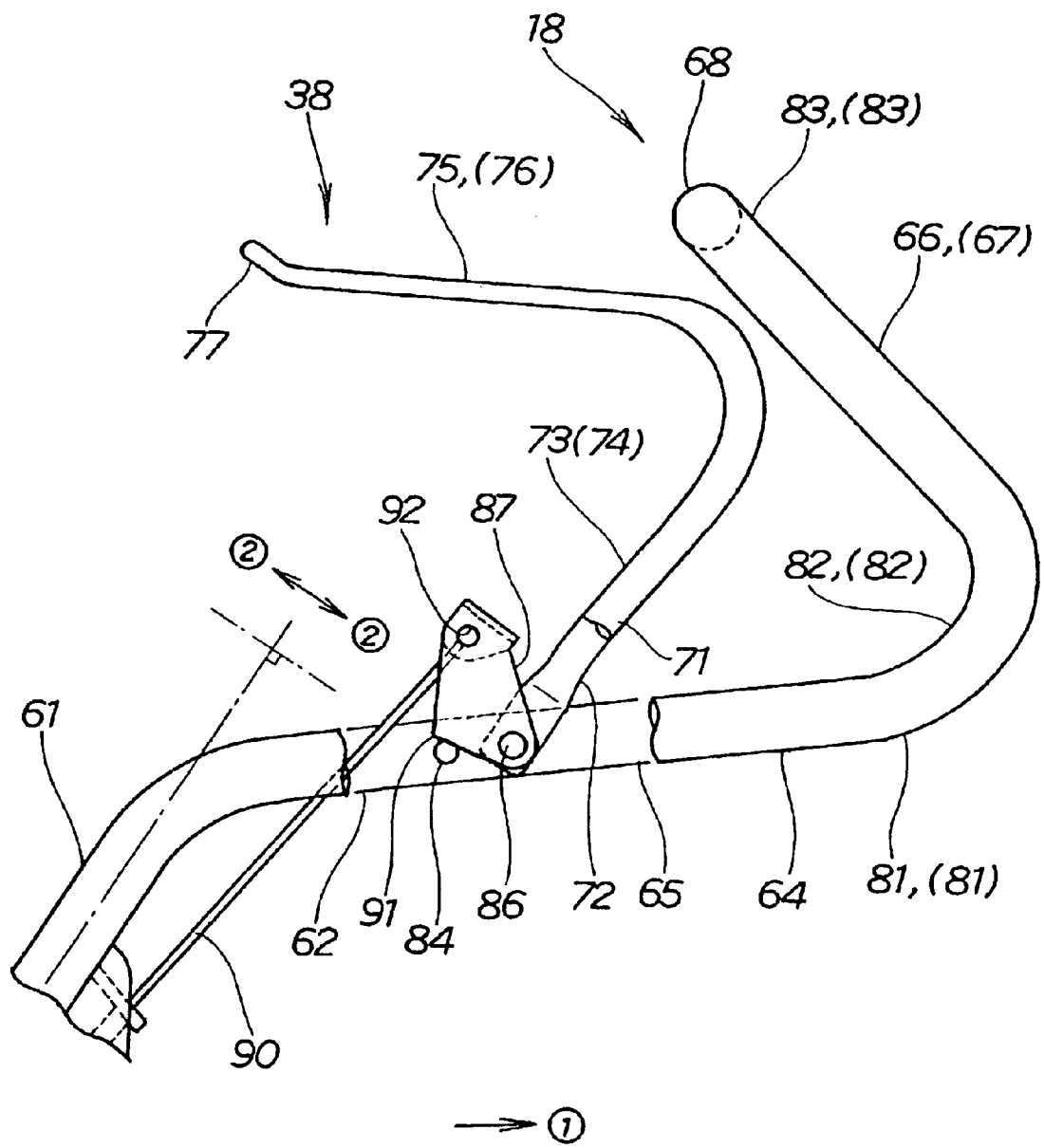
FIG. 5 is a side view of the handle and clutch lever shown in FIG. 4.

The left and right horizontal grips 64, 65 of the handle 18 extend rearward from the handle proximal portions 61, 62 shown in FIG. 3 as shown by arrow ① in FIG. 5 approximately parallel with the traveling surface G (see FIG. 2). The left and right rising portions 66, 67 of the handle 18 are raised via rounded portions 82, 82 from rear ends 81, 81 of the horizontal grips 64, 65 in a direction approximately orthogonal to the handle proximal portions 61, 62 (direction of arrows ②,②). The cross portion 68 is connected between upper ends 83, 83 (see FIG. 4) of the rising portions 66, 67. A first stopper 84 for restricting swinging of the clutch lever 38 is provided at the right handle proximal portion 62.

The supported end 72 of the clutch lever 38 is welded to a shaft member 86 rotatably mounted to the right horizontal grip 65. The supported end 72 has a shape of a flattened steel pipe. A bracket 87 is welded at its one end to the shaft member 86 and has at the other end a wire engaging hole 92 to which the distal end of a clutch wire 90 is connected. The bracket 87 also has a second stopper 91 to abut on the first stopper 84 thereby to prevent further rotation. The clutch wire 90 is pulled via the shaft member 86 and the bracket 87 by swinging the clutch lever 38 toward the handle 18 to turn the clutch on.

Figure 6:
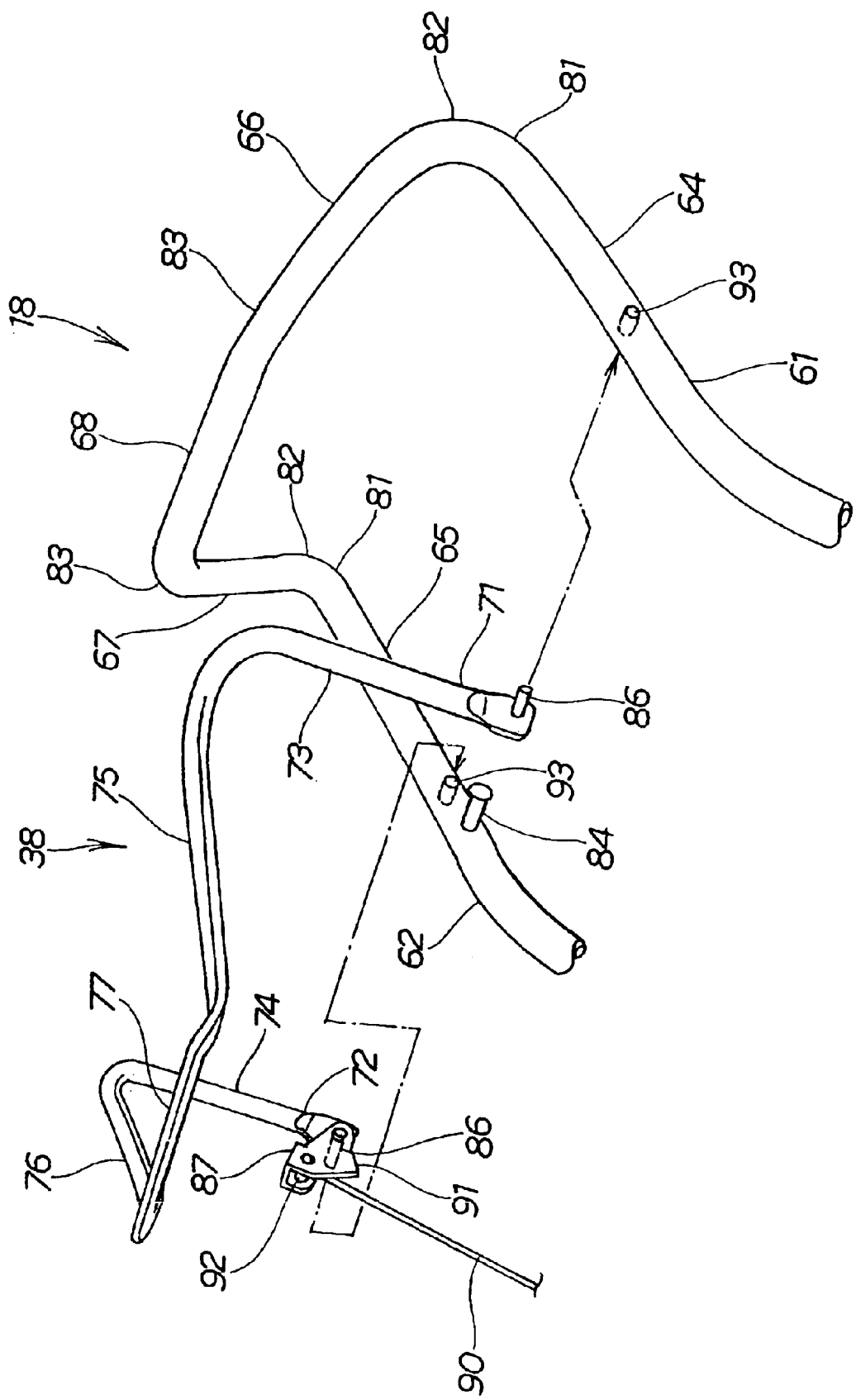
FIG. 6 is an exploded perspective view of the handle and clutch lever shown in FIGS. 3 and 4.

As shown in FIG. 6, the shaft members 86, 86 fixed to the supported ends 71, 72 of the clutch lever 38 are fitted into fitting holes 93, 93 formed in the left and right horizontal grips 64, 65 of the handle 18. As described above, the handle 18 having the left and right horizontal grips 64, 65, left and right rising portions 66, 67 and the cross portion 68 is made of a steel pipe formed in a loop.

Figure 7:
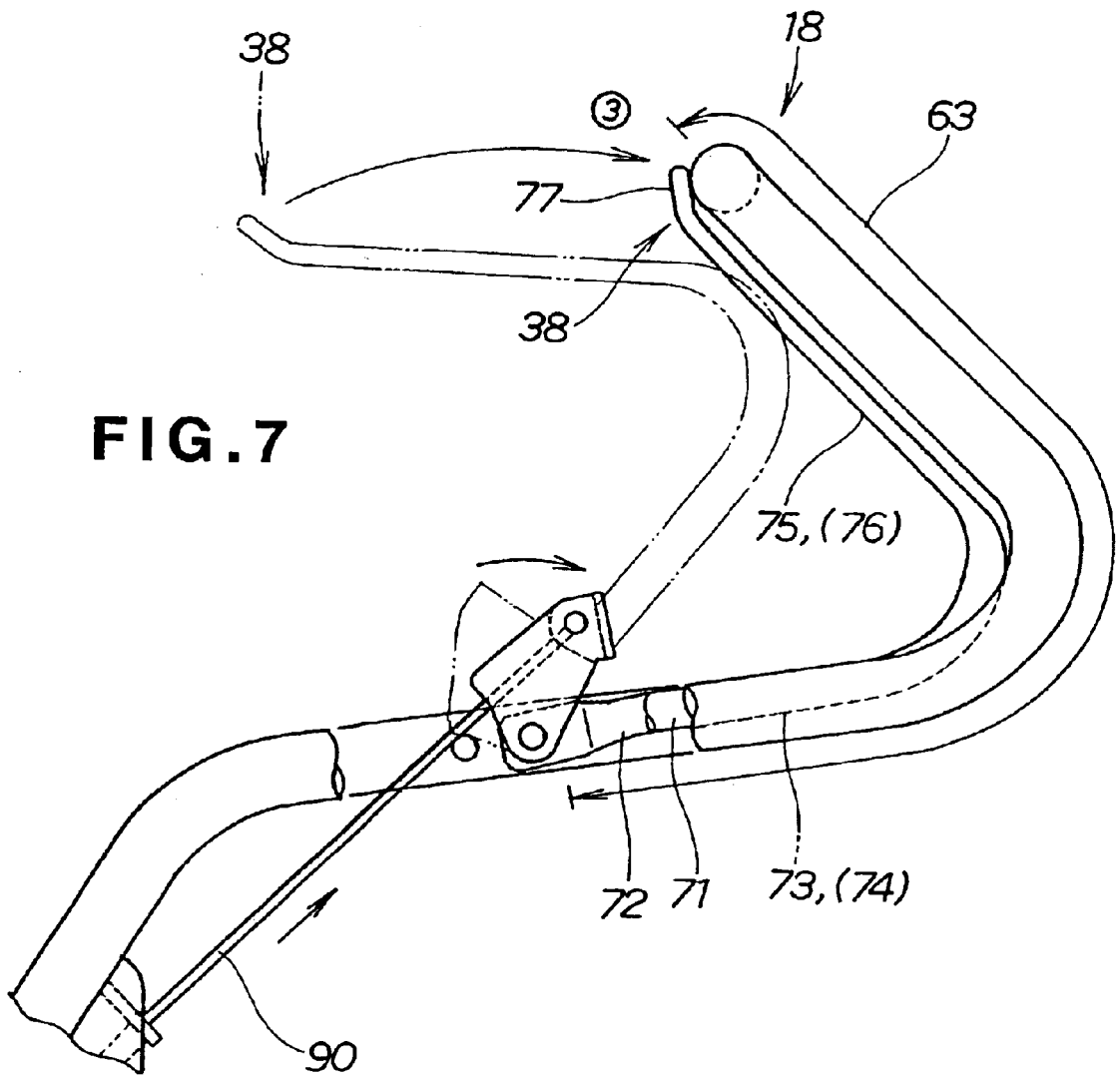
FIG. 7 is a diagram illustrating the movement of the clutch lever from the state of the clutch lever shown in FIG. 5.

As shown in FIG. 7, the clutch lever 38 is shaped to substantially correspond to the shape of the handle grip 63 of the handle 18 when manually swung in the direction of arrow ③ so that the clutch lever 38 and the handle grip 63 can be manually put together into a single grip to be held (see also the clutch lever 38 in chain double-dashed lines in FIG. 4). Under the resultant clutch engaged state, the tiller 10 moves forward. Conversely, when the hold is released, the clutch lever 38 is returned by a spring to a position shown by chain double-dashed lines, disengaging the clutch, and stopping the tiller 10.

Now, the method of using the handle 18 and the clutch lever 38 of the tiller 10 will be described with reference to FIGS. 8 to 13.

Figure 8:
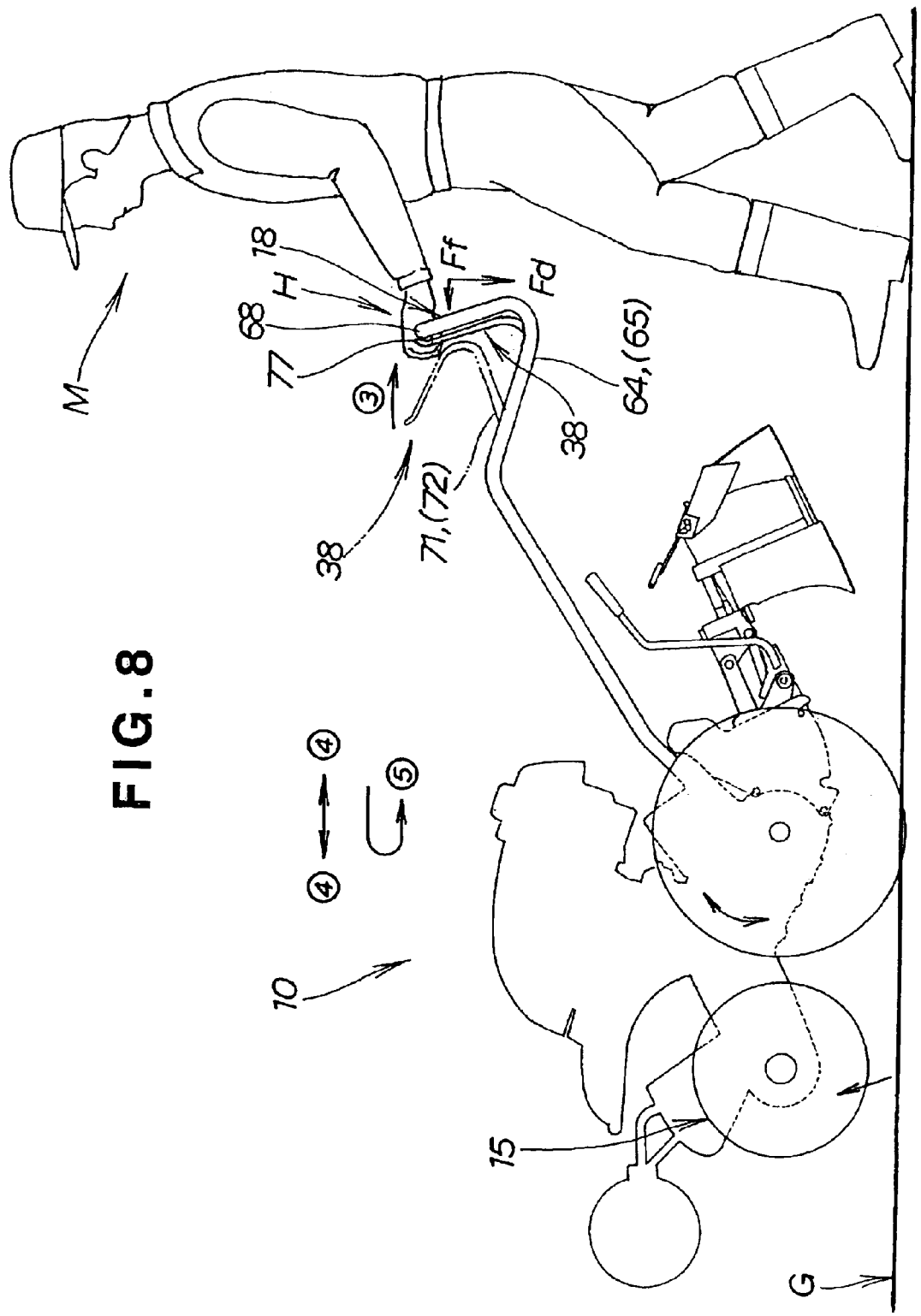
FIGS. 8 and 9 are diagrams illustrating operation with the tiller with a cross portion of the handle and a lever horizontal portion of the clutch lever gripped.
Figure 9:
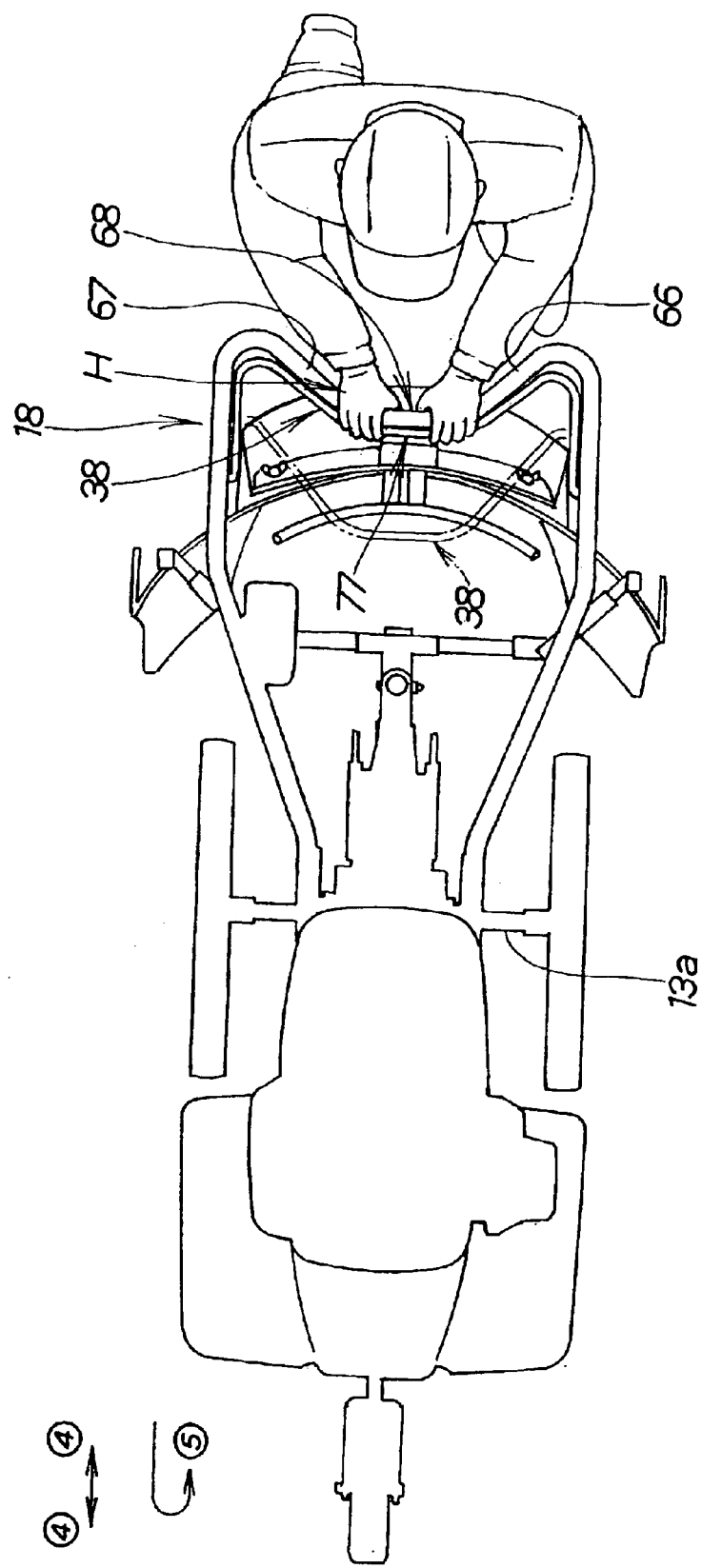

FIGS. 8 and 9 illustrate that the cross portion 68 of the handle 18 and the lever cross portion 77 of the clutch lever 38 are held together.

As shown in FIGS. 8 and 9, for moving the tiller 10 in longitudinal directions (directions of arrows (④,④) or turn it (in the direction of arrow ⑤), it is necessary to lift the tilling device 15 and keep it off the traveling surface G. More specifically, an operator M holds the cross portion 68 of the handle 18 by his hands H and pushes the cross portion 68 downward by a force Fd to lift the tilling device 15 located forward of the travel wheels 13 about the axle 13a of the travel wheels 13. Since the cross portion 68 of the handle 18 is parallel with the axle 13a, it is easy to push the cross portion 68 downward. The clutch lever 38 is held together, so that the tiller 10 moves forward by the travel wheels 13. Thus, a small force Ff is required for the operator M to move the tiller 10 forward. Accordingly, the operator M can position his arms suitably for maintaining the forces Ff, Fd, maintaining a comfortable work posture.

For gripping the clutch lever 38, the corresponding shape of the lever cross portion 77 of the clutch lever 38 to the shape of the cross portion 68 of the handle 18 as shown in FIGS. 4 and 7 allows the cross portion 68 and the lever cross portion 77 to be held together. For manually operating the clutch lever 38 to move forward/backward or turn the tiller 10, it is not necessary to change the current positions of the hands H holding the cross portion 68 of the handle 18.

Figure 10:
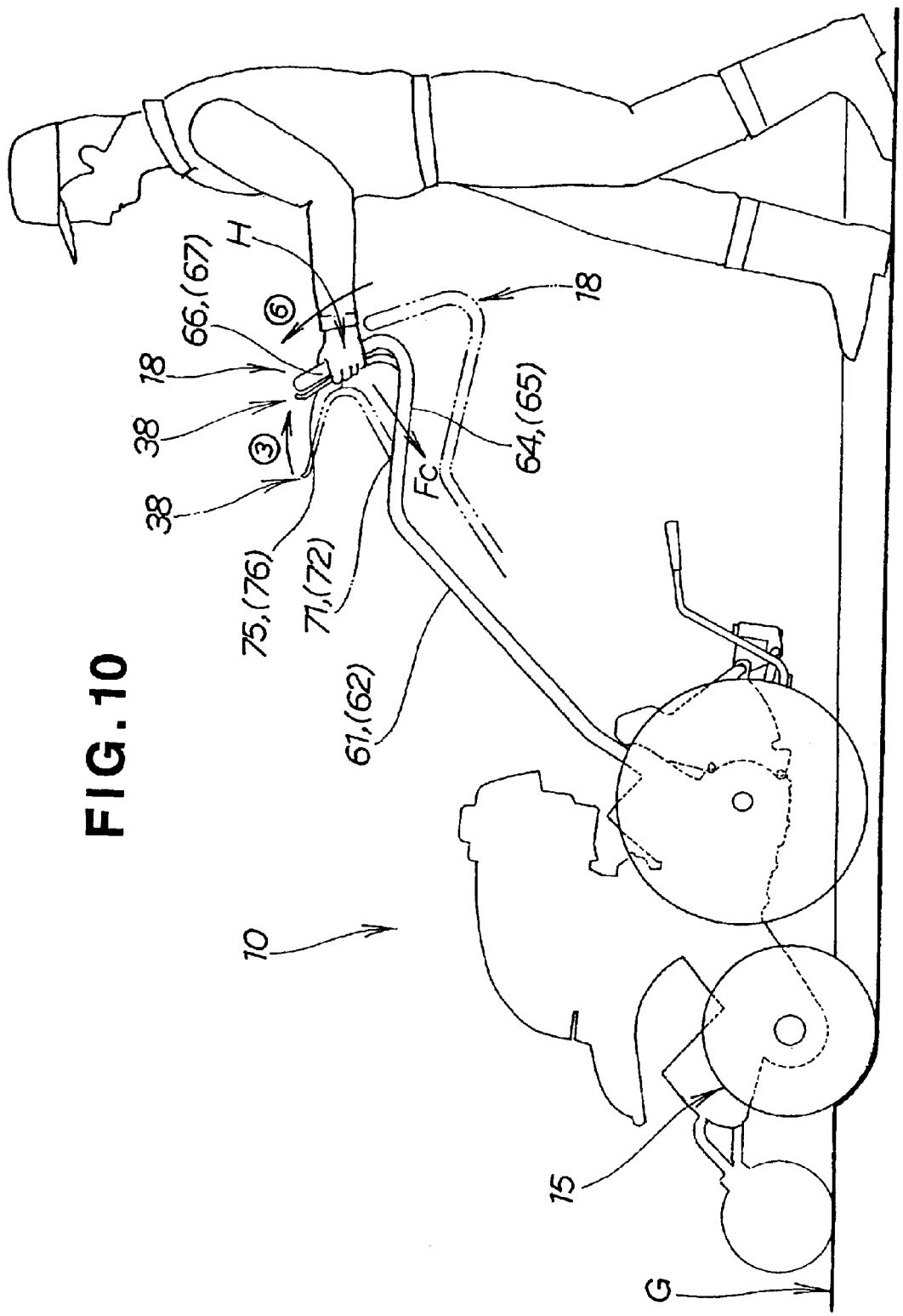
FIGS. 10 and 11 are diagrams illustrating operation with the tiller with left and right rising portions of the handle and left and right lever forward-tilted portions of the clutch lever gripped.
Figure 11:
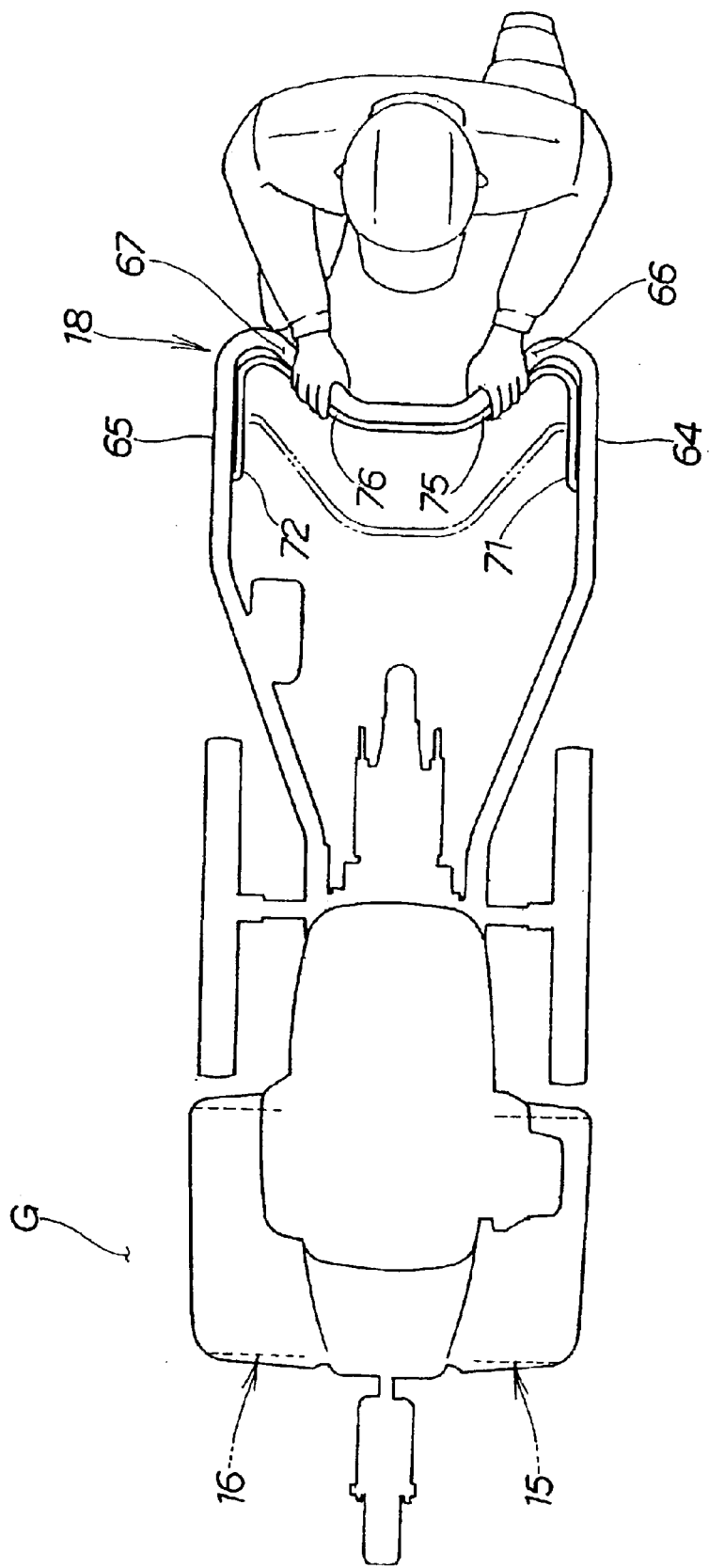

FIGS. 10 and 11 illustrate the tiller 10 in operation with the left and right rising portions 66, 67 of the handle 18 held.

As shown in FIGS. 10 and 11, for working the soil with the tiller 10, it is necessary to lift the handle 18 in a direction of arrow ⑥ to cause the tilling device 15 to sufficiently dig into the soil (traveling surface G). Since the left and right rising portions 66, 67 are configured to extend upward from the rear ends of the horizontal grips 64, 65 in a direction approximately orthogonal to the handle proximal portions 61, 62 (see FIG. 5), the oblique application of a pressure force Fc in a forward and downward direction to the rising portions 66, 67 by the hands H and arms allows the application of the pressure force Fc to the tilling device 15a in a natural posture. Thus, a comfortable work posture can be maintained at all times during tilling operations. Specifically, the forward tilting of the rising portions 66, 67 at their upper portions facilitates the oblique application of the pressure force Fc in a forward and downward direction, preventing the action of needless forces at the wrists and the arms, and allowing smooth tilling operations.

The left and right lever forward-tilted portions 75, 76 of the clutch lever 38 has a shape corresponding to the shape of the left and right rising portions 66, 67 of the handle 18 and are arranged in proximity, so that the lever forward-tilted portions 75, 76 can be held together with the rising portions 66, 67. Thus, the need for changing the current positions of the hands holding the rising portions 66, 67 to operate the clutch lever 38 is eliminated, resulting in improved operability.

Figure 12:
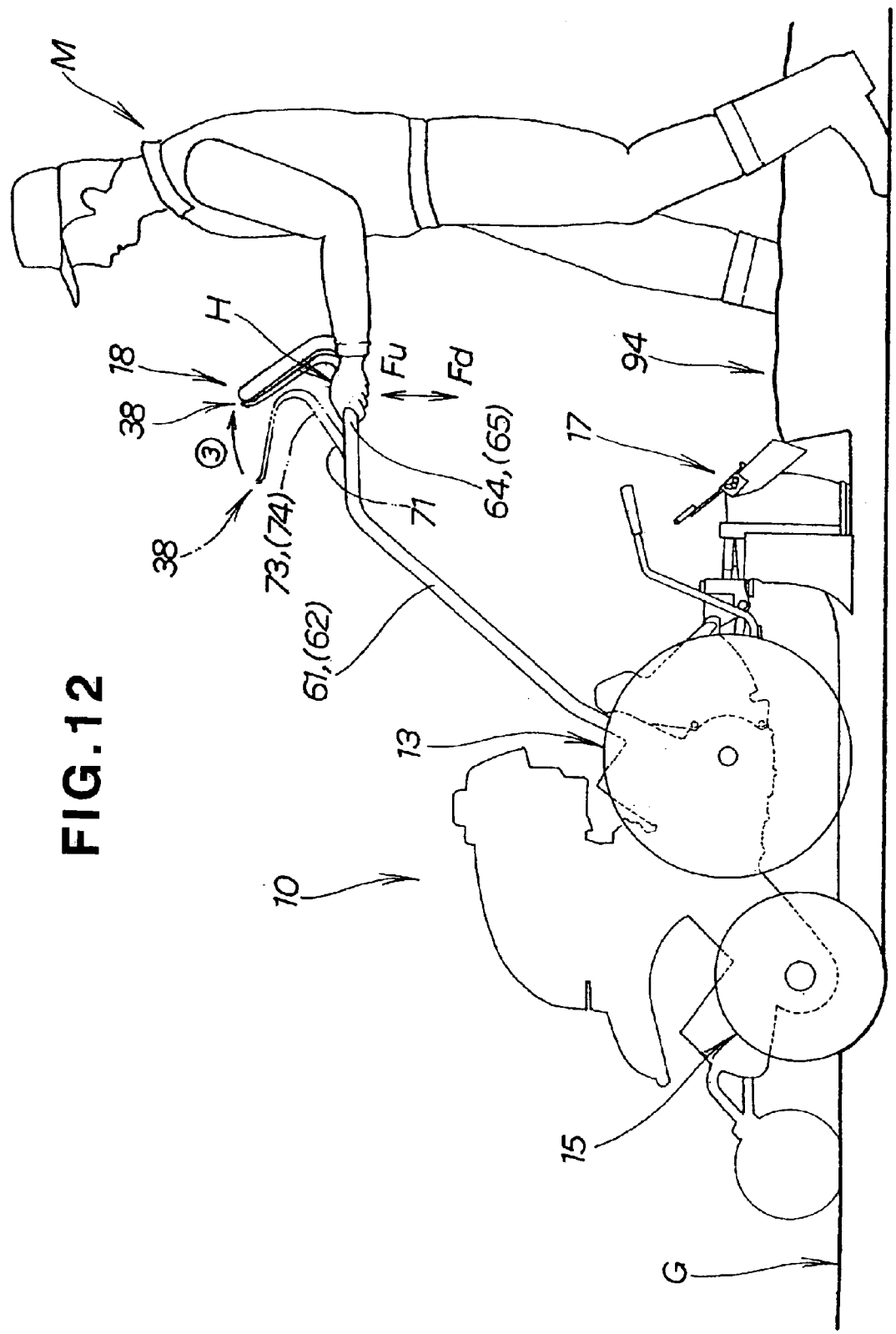
FIGS. 12 and 13 are diagrams illustrating operation with the tiller with left and right horizontal grips of the handle and left and right lever horizontal portions of the clutch lever gripped.
Figure 13:
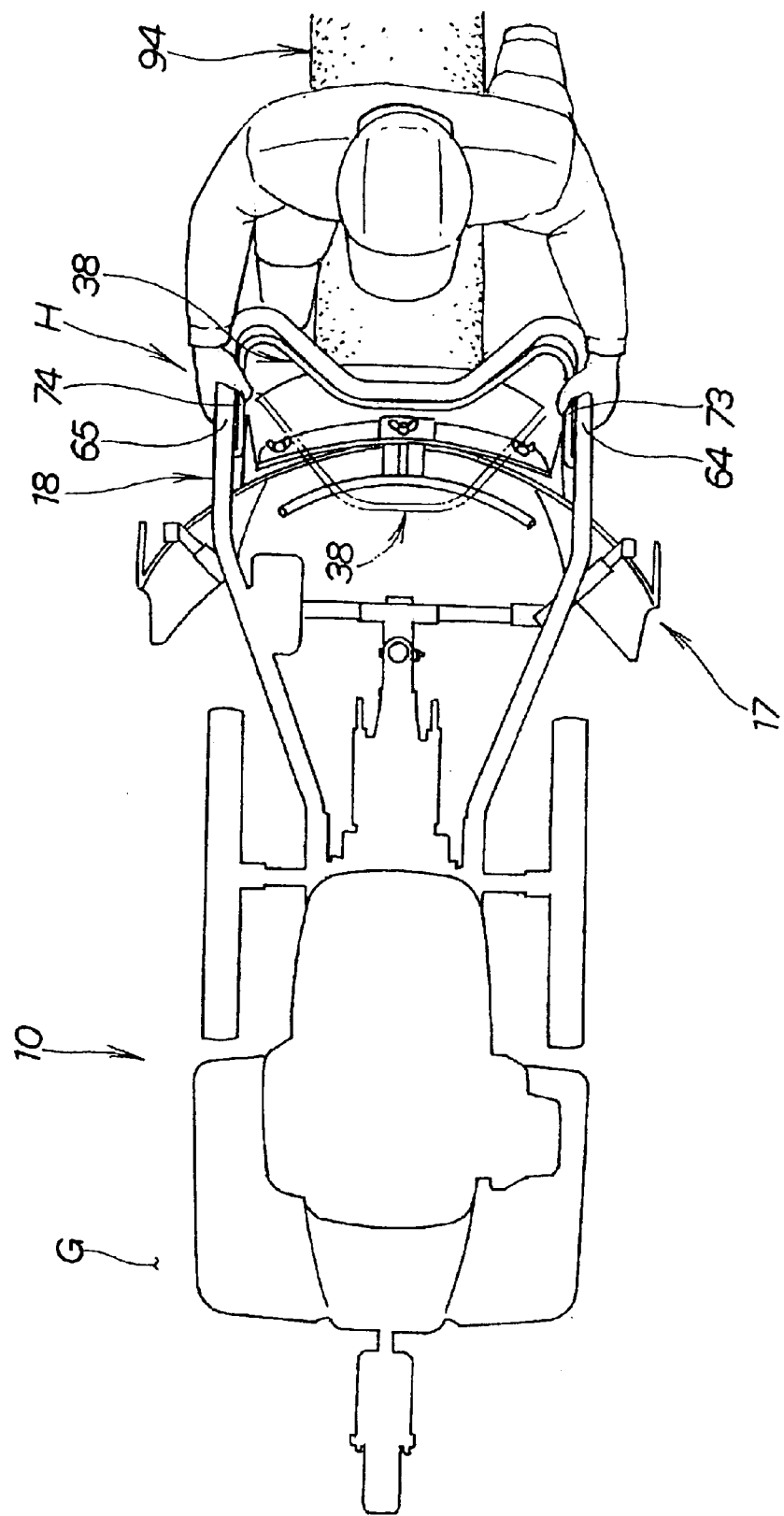
Figure 14:
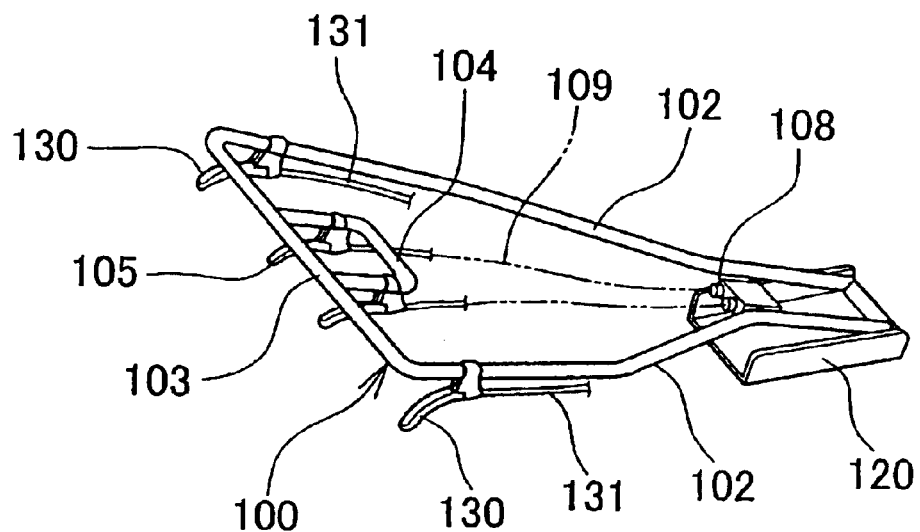
FIG. 14 is a diagram of a conventional loop-shaped handle provided to a tiller.
Figure 15:
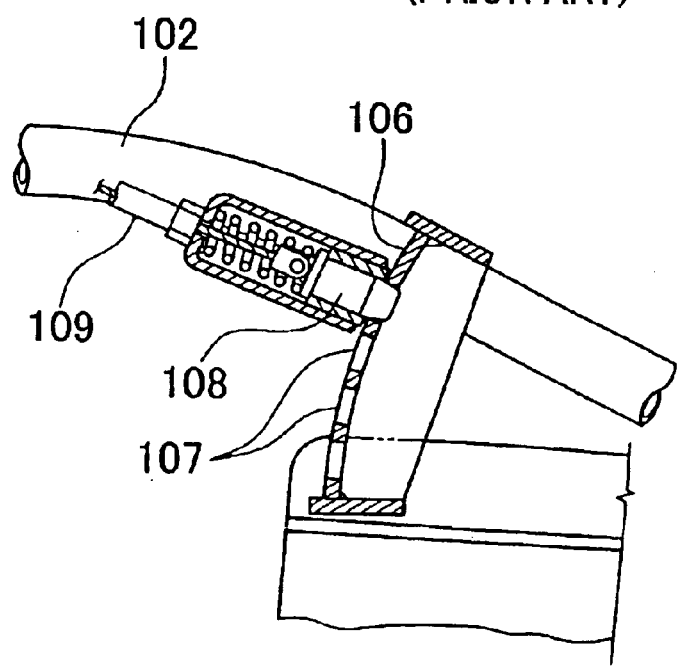
FIG. 15 is a diagram of a lock mechanism of the handle shown in FIG. 14.
Figure 16:
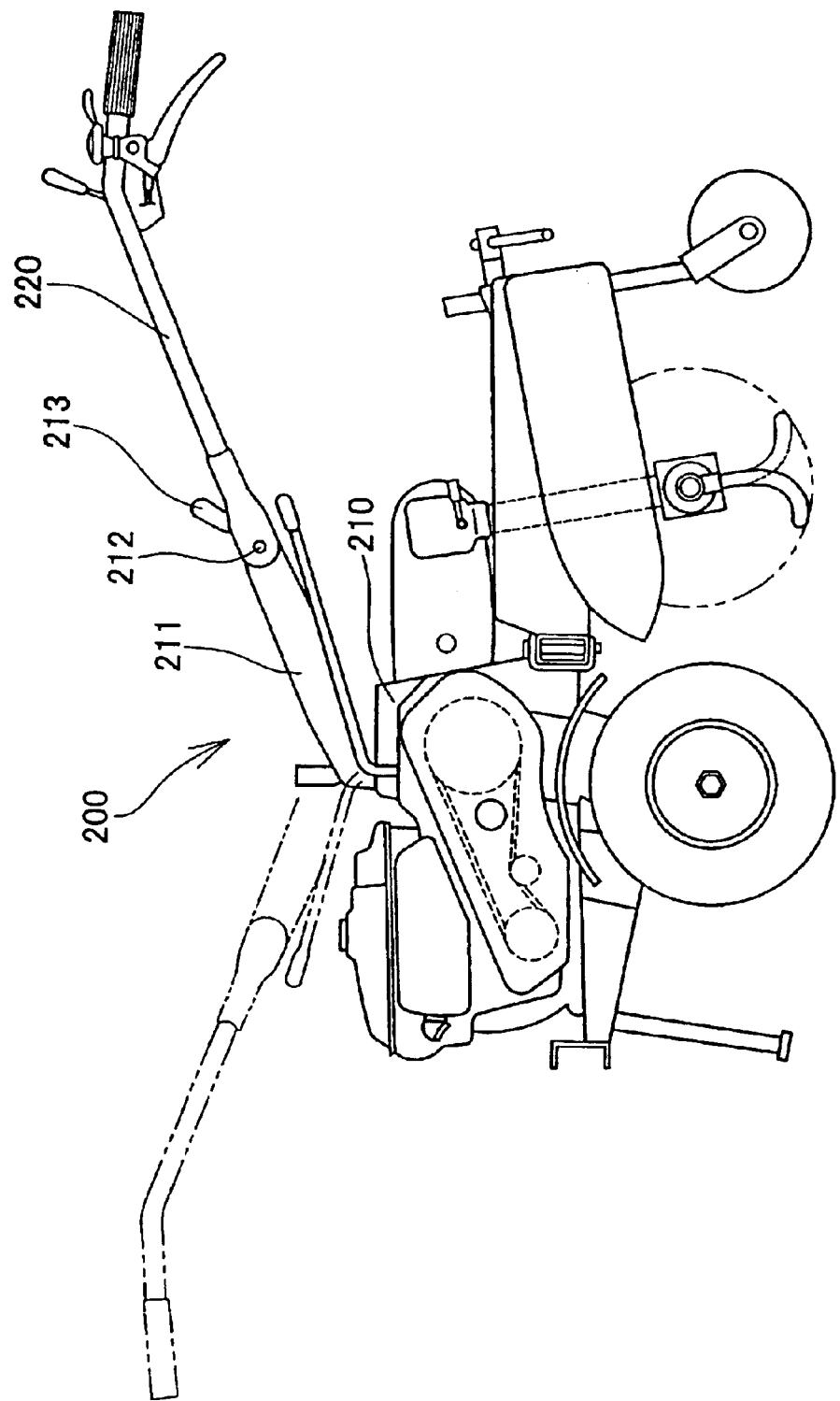
FIG. 16 is a side view of a conventional tiller provided with a vertically adjustable handle.
Figure 17:
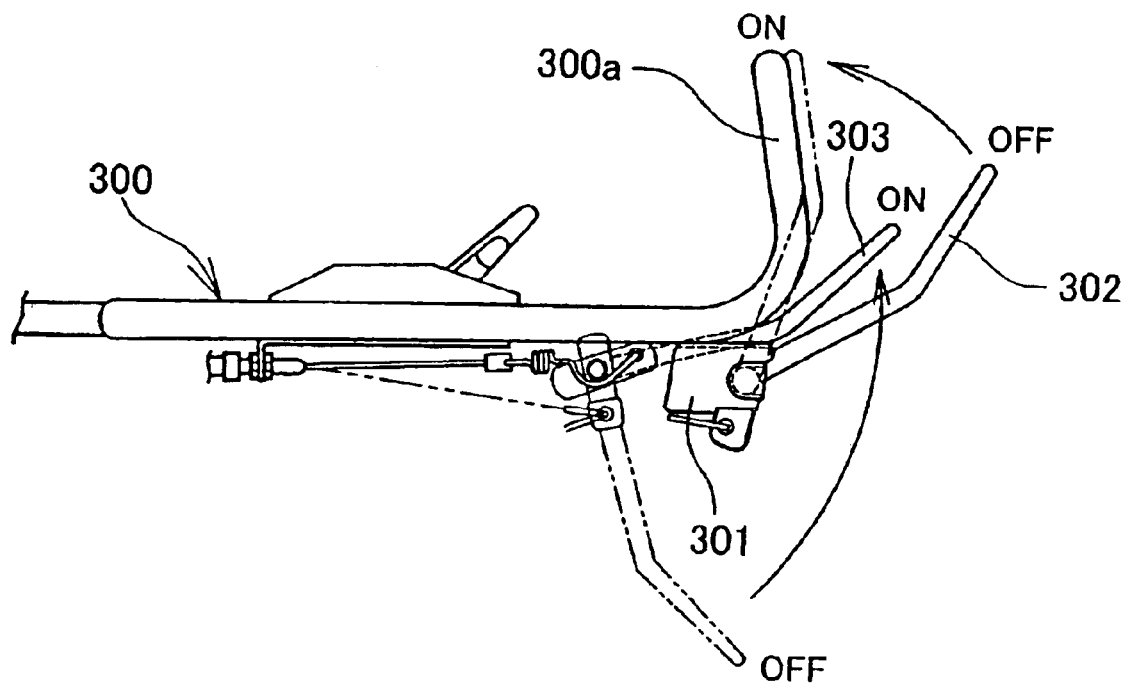
FIG. 17 is a diagram of a conventional loop-shaped handle having a looped clutch lever.

FIGS. 12 and 13 illustrate that the horizontal grips 64, 65 of the handle 18 and the lever horizontal portions 73, 74 of the clutch lever 38 are held together for ridging during tilling.

As shown in FIGS. 12 and 13, for forming a ridge 94 by the ridger 17 connected to the rear of the tiller 10, the tilling device 15 and the travel wheels 13 shown in FIG. 2 are contacted with the soil (traveling surface G) substantially in the same level to set the ridger 17. That is, it is necessary to hold the tiller 10 substantially horizontally to the traveling surface G. The hold is maintained by holding powers Fu, Fd. Since the left and right horizontal grips 64, 65 extend approximately in parallel with the traveling surface G, the holding powers Fu, Fd of the hands H and arms can be naturally applied to the horizontal grips 64, 65 to act at the tilling device 15 and the ridger 17 in a natural posture. The operator can also maintain a comfortable work posture during ridging operation which is simultaneously done with tilling operation.

Since the loop-shaped handle 18 of the present embodiment is provided with the left and right horizontal grips 64, 65, it facilitates controls for stabilizing the work position of the tiller body such as lateral balancing of the body or fine adjustment of vertical position of the handle 18, allowing a good result of work such as ridging or ditching.

During ridging operation, the tiller 10 is held substantially horizontally to the traveling surface G by the hands H and arms. The provision of the left and right horizontal grips 64, 65 eliminates the need for unnaturally bending the wrists and arms, allowing maintaining a comfortable work posture.

Since the left and right lever horizontal portions 73, 74 of the clutch lever 38 correspond in shape to the left and right horizontal grips 64, 65 of the handle 18, they can be held together. It is thus also needless to change the current positions of the hands holding the horizontal grips 64, 65 for operating the clutch lever 38 during ridging operation.

As shown in FIG. 6, the handle 18 has a simple configuration made of a steel pipe formed in a loop including the left and right horizontal grips 64, 65, left and right rising portions 66, 67 and cross portion 68, resulting in reduction in handle production costs.

Obviously, various minor changes and modifications of the present invention are possible in the light of the above teaching. It is therefore to be understood that within the scope of the appended claims the invention may be practiced otherwise than as specifically described.

What is claimed is:

1. A walk-behind tiller comprising:
a body having a forward end and a rear end;
an axle mounted on the rear end of the body;
a pair of left and right travel wheels mounted to apposite ends of the axle for undergoing rotation about a rotational axis to cause the walk-behind tiller to undergo travelling along a around surface;
a tilling device mounted on the body forwardly of the left and right travel wheels for undergoing a first movement operation in which the tilling device travels along or makes a turn on the around surface while the tilling device is disposed in spaced-apart relation to the around surface, a second movement operation in which the tilling device tills the ground, and a third movement operation in which the tilling device is maintained generally horizontal to the ground surface; and
a handle having left and right proximal portions extending upwardly from the rear end of the body, left and right horizontal grips extending rearwardly from respective ones of the proximal portions and configured to be gripped by an operator to maintain the tilling device generally horizontal to the ground surface during the third movement operation, left and right rising portions extending upwardly from respective ones of the left and right horizontal grips in a direction generally orthogonal to the proximal portions and configured to be tilted forwardly and downwardly by the operator during the second movement operation to cause the tilling device to till the ground, and a cross portion disposed between upper ends of the left and right rising portions and configured to be gripped and depressed by the operator to produce a downward force tending to lift the tilling device upward about the rotational axis to maintain the tilling device in spaced-apart relation to the ground surface.

2. A walk-behind tiller according to claim 1; further comprising a clutch mounted on the body and a clutch lever mounted on the handle for undergoing pivotal movement relative to the handle from a first position to place the clutch in an engaged state to a second position to place the clutch in a disengaged state, the clutch lever having left and right support end portions pivotally mounted on at least one of the left and right horizontal grips, left and right first lever portions extending rearwardly from respective ones of the left and right support end portions and having a shape corresponding to that of respective ones of the left and right horizontal grips of the handle, and left and right second lever portions extending upwardly from respective ones of the left and right first lever portions and having a shape corresponding to that of respective ones of the left and right rising portions of the handle.

3. A walk-behind tiller according to claim 2; wherein in the disengaged state of the clutch, the left and right second lever portions of the clutch lever are disposed proximate to respective ones of the left and right rising portions of the handle so that the operator can hold the left and right second lever portions of the clutch lever together with the left and right rising portions of the handle.

4. A walk-behind tiller according to claim 3; wherein the clutch lever pivots away from the forward end of the body during pivotal movement from the first position to the second position thereof.

5. A walk-behind tiller according to claim 2; wherein the clutch lever is configured to pivot away from the forward end of the body during pivotal movement of the clutch lever from the first position to the second position thereof.

6. A walk-behind tiller according to claim 2; further comprising a ridge forming device connected to a rear end portion of the tilling device for forming a ridge in the ground surface during a ridge forming operation while the tilling device is in contact with the ground surface.

7. A walk-behind tiller according to claim 6; wherein the tilling device is disposed generally parallel to the ground surface during the ridge forming operation.

8. A walk-behind tiller according to claim 6; wherein the left and right travel wheels are disposed between the tilling device and the ridge forming device.

9. A walk-behind tiller comprising:
a body having a forward end and a rear end;
a pair of travel wheels mounted on the body for undergoing rotation about a rotational axis to cause the walk-behind tiller to undergo travelling along a ground surface;
a tilling device mounted on the body for undergoing a first movement operation in which the tilling device travels along or makes a turn on the ground surface while the tilling device is disposed in spaced-apart relation to the ground surface, a second movement operation in which the tilling device tills the ground, and a third movement operation in which the tilling device is maintained generally horizontal to the ground surface; and a handle having proximal portions extending from the body, a pair of grip portions extending from respective ones of the proximal portions and configured to be gripped by an operator to maintain the tilling device generally parallel to the ground surface during the third movement operation, a pair of rising portions extending from respective ones of the grip portions and configured to be tilted by the operator during the second movement operation to cause the tilling device to till the ground, and a cross portion disposed between the rising portions and configured to be gripped and pressed by an operator to produce a force tending to move the tilling device about the rotational axis to maintain the tilling device in spaced-apart relation to the ground surface.

10. A walk-behind tiller according to claim 9; further comprising a clutch mounted on the body and a clutch lever mounted on the handle for undergoing pivotal movement relative to the handle from a first position to place the clutch in an engaged state to a second position to place the clutch in a disengaged state, the clutch lever having a pair of support end portions pivotally mounted on respective ones of the grip portions of the handle, a pair of first lever portions extending from respective ones of the support end portions, and a pair of second lever portions extending from respective ones the first lever portions.

11. A walk-behind tiller according to claim 10; wherein in the disengaged state of the clutch, the second lever portions of the clutch lever are disposed proximate to respective ones of the rising portions of the handle so that the operator can hold the second lever portions of the clutch lever together with the rising portions of the handle.

12. A walk-behind tiller according to claim 11; wherein the clutch lever pivots away from the forward end of the body during pivotal movement from the first position to the second position thereof.

13. A walk-behind tiller according to claim 10; wherein the clutch lever is configured to pivot away from the forward end of the body during pivotal movement of the clutch lever from the first position to the second position thereof.

14. A walk-behind tiller according to claim 10; further comprising a ridge forming device connected to a rear end portion of the tilling device for forming a ridge in the ground surface during a ridge forming operation while the tilling device is in contact with the ground surface.

15. A walk-behind tiller according to claim 14; wherein the tilling device is disposed generally parallel to the ground surface during the ridge forming operation.

16. A walk-behind tiller according to claim 14; wherein the travel wheels are disposed between the tilling device and the ridge forming device.

* * * * *